United States Patent [19]

Gray et al.

[11] Patent Number: 4,661,811
[45] Date of Patent: Apr. 28, 1987

[54] VIDEO MAP DISPLAY

[75] Inventors: Michael J. Gray; Ian Langdon, both of Woodbridge; Barry J. Woods, Ipswich, all of England

[73] Assignee: British Telecommunications plc, United Kingdom

[21] Appl. No.: 648,689

[22] Filed: Sep. 10, 1984

[30] Foreign Application Priority Data

Sep. 12, 1983 [GB] United Kingdom ................ 8324318

[51] Int. Cl.⁴ ............................................. G09G 1/14
[52] U.S. Cl. .................................... 340/744; 340/724; 340/734; 340/995
[58] Field of Search ............... 340/723, 724, 731, 734, 340/744, 747, 995

[56] References Cited

U.S. PATENT DOCUMENTS

| 4,107,662 | 8/1978 | Endo et al. ........................... 340/731 |
| 4,398,171 | 8/1983 | Dahan et al. ...................... 340/734 X |
| 4,400,780 | 8/1983 | Nagao et al. ...................... 340/731 X |
| 4,523,188 | 6/1985 | Huber .................................. 340/724 X |
| 4,527,155 | 7/1985 | Yamaki et al. ................... 340/724 X |
| 4,528,552 | 7/1985 | Moriyama et al. ............... 340/724 X |
| 4,566,127 | 1/1986 | Sekiya et al. ...................... 340/734 X |

OTHER PUBLICATIONS

IEE Transaction on Communications, vol. COM-31, No. 2, Feb. 1983, New York (US), R. D. Gordon: "An Interactive Video Information Terminal", pp. 245-250, *p. 245, Right-Hand Column, Lines 6-18; p. 249, Left--Hand Column, Lines 25-37.
IBM Technical Disclosure Bulletin, vol. 25, No. 8, Jan. 1983, New York (US), P. S. Cohen, et al.: "Video Disc Dictionary System", p. 4209 *The Whole Document.

Primary Examiner—Gerald L. Brigance
Assistant Examiner—Vincent P. Kovalick
Attorney, Agent, or Firm—Nixon & Vanderhye

[57] ABSTRACT

Map frames are stored on a video storage medium such as video disc, and a graphics generator stores overlay information such as the location of telephone lines plant. To accommodate maps of different scales covering the same area, the graphics generator applies a corresponding scaling factor to generation of the overlay image, for accurate superimposition of the map. Provision may also be made for correcting inaccuracies in the original process of recording the map frames.

14 Claims, 4 Drawing Figures

VIDEO MAP DISPLAY

There are many applications where the display of information in relation to a map background is a major requirement e.g. the updating of line plant records by public utilities (telephones, gas, water, electricity etc.), display of management information statistics related to geographical areas, military command and control systems, etc.

There is an obvious attraction in transferring all this information onto a computer, to give easier retrieval and updating of the records. However, attempts to computerise map-related data have in the past faltered over the difficulty of displaying the map information alongside the recorded data. For the computer to be able to display maps on a graphics terminal, the maps have first had to be digitised into vector form, and the vectors stored in a computer database. This system, whilst allowing the map data (e.g. position of roads, new houses, etc.) to be easily amended, has three major disadvantages:

(1) There is so much detail on maps used for purposes such as line plant records that the resulting vector coded data occupies about 1 Mbyte of computer storage for each square kilometer of a 1:1250 scale map. To cover usable area, say 400 km$^2$, a major city or a Telephone Area, the resulting storage requirement (400 Mbytes) necessitates a large disc system, with the computer to hold all the map information, and is therefore costly to provide.

(2) Depending on the size of the area to be viewed, it can take several minutes to draw the map background at the graphics terminal, particularly if it is connected to a remote computer using a serial data link.

(3) Digitisation is a time-consuming and expensive process—Ordnance Survey are in the process of digitising all their maps of Great Britain, but do not expect the task to be completed before the year 2000, although the majority of high density urban areas may become available sooner.

According to the present invention there is provided an information display apparatus comprising video reproduction means for producing video signals from a storage medium representing any one of a plurality of map frames of different scales recorded on the medium, graphic generator means for generating, from overlay information in digital form, video signals representing all or part of the said overlay information, means for combining the said video signals, control means including means for storing the overlay information and arranged in operation in response to information indicative of the geographical area covered by, and the relative scale of, a map frame selected for display to select from the overlay storage means overlay information in respect of that area and to control the graphic generator means so as to display the overlay information at the same scale as the map frame.

The type of video reproduction means is not critical to the invention; however, the use of videodisc storage is preferred in view of its large storage capacity, relatively low cost and ease of still frame reproduction, as compared with, for example, magnetic tape.

By using a videodisc to hold the map background and overlaying it with vector coded database information:

(1) Hard copy maps can be stored onto 35 mm cinematography film or videotape and transferred onto a videodisc hence removing the need for vector coding.

(2) The videodisc has a vast storage capacity thus enabling large geographic areas to be stored at low cost. A typical videodisc has a storage capacity of around 50,000 frames per side; even storing different scale maps still allows an area of about 200 square kilometers to be held on one side of a disc and viewed down to the level of a 100 meter square.

(3) The cost of the videodisc player and reproduction discs is sufficiently low that each graphics workstation could be provided with its own videodisc player.

One embodiment of the present invention will now be described by way of example with reference to the accompanying drawings, in which.

Figure 1:
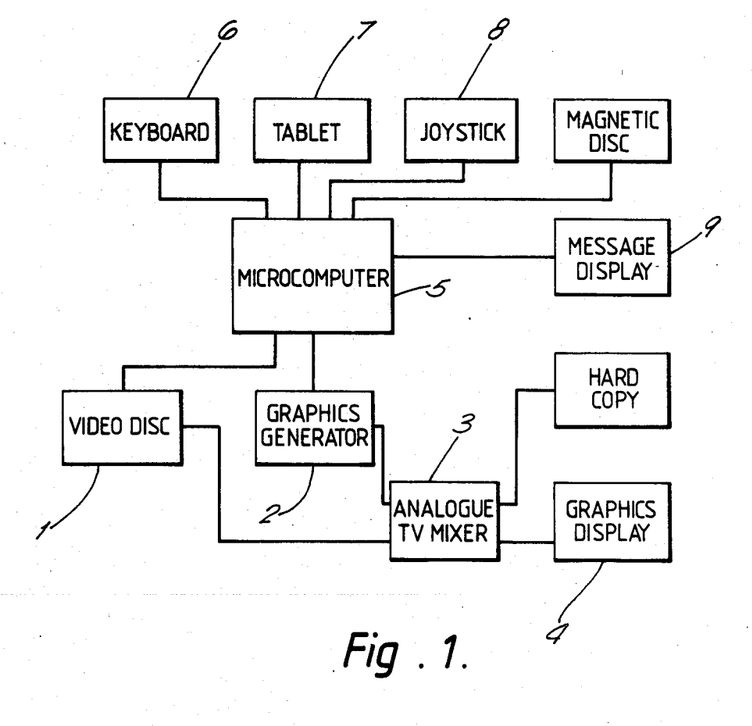
FIG. 1 is a block diagram of a map display apparatus.

FIG. 1 shows a block diagram of a typical map display system. A videodisc player 1 provides for retrieval of map frames stored on a videodisc: although intended for the display of moving pictures, videodisc players have extremely good still-frame facilities, and can rapidly jump to any other still-frame required under automatic control. If necessary for larger areas, more than one player could be used. Overlay information is generated by a vector graphics generator 2 (e.g. the Sigma type 5664), its RGB video output being combined with that of the video disc player 1 in a vision mixer 3 for display on a raster-scan colour monitor.

The action of the vision mixer is controllable. A straightforward analogue TV mix yields an image in which map detail and vector information are equally combined thus allowing the map detail, in some instances, to obscure the vector information. Alternatively, the mixer has the ability to give priority to the vector information such that it overlays the map detail.

The mixer may also be provided with a number of additional facilities to aid the operator: the map background can be turned off to enable the line plant detail to be seen more clearly; all computer generated vector information can be switched to peak white in order to improve the hard copy output; finally, the map can be displayed in reverse video to compare the output directly with that obtained from a vector coded map.

Figure 2:
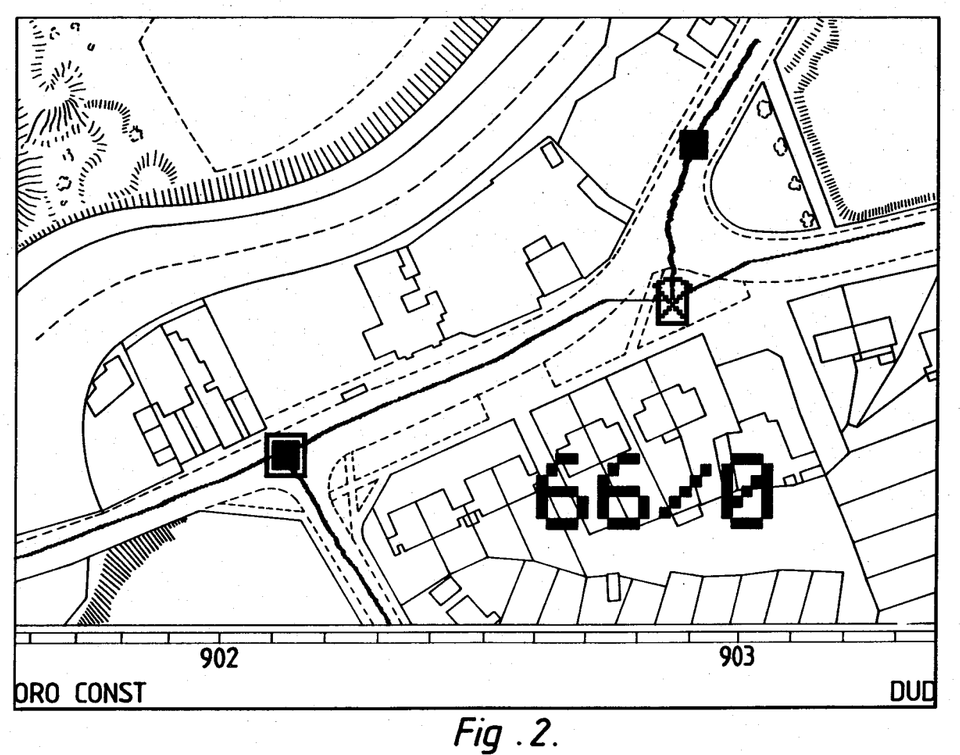
FIG. 2 illustrates a typical display.
Figure 3:
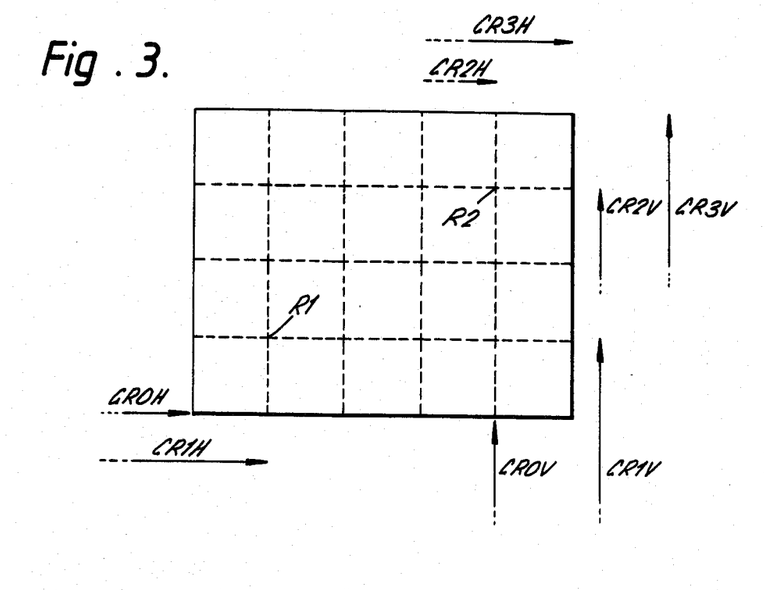
FIGS. 3 and 4 illustrate the use of reference points.
Figure 4:
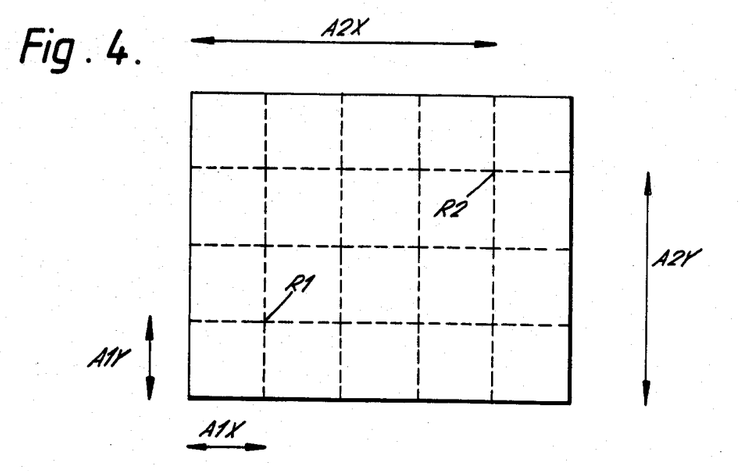

A video hard copy device provides an A4 size copy of the combined picture. A portion of map overlaid with line plant data is shown in FIG. 2 by way of illustration.

System control is provided by a microcomputer 5. This serves to interface to the user via a keyboard 6, to graphics tablet 7 and joystick 8, and to carry out the functions of:

(i) storage and retrieval of indexing, control and overlay data
(ii) control of the videodisc player for map frame selection
(iii) processing of overlay data and transmission to the vector graphics generator.

A text display monitor 9 is also included to show the status of the system and messages to the user. It could easily be developed to display textual information from the database (e.g. information about cables in a particular duct) or information derived from the graphics display (e.g. the distance between two points).

Before describing the system operation in detail, a brief specification of the facilities offered will be given, followed by particulars of the data storage requirements.

1. It is assumed that an area of 200 km² is covered by each videodisc; and that map frames can be displayed at a number of scales in which, respectively, the map displayed on the monitor covers a nominal area of:
   level 0—the entire area
   level 1—km square
   level 2—1 km square
   level 3—300 m square
   level 4—100 m square 2. For interface with the user, and for certain purposes within the system, a coordinate system is employed; conveniently this can be (in the UK) the National Grid system. The graphics generator requires information to be input in terms of pixel coordinates e.g. assuming a resolution of 768×512 picture elements, x-y coordinates with x in the range 0 to 767 and y in the range 0 to 511.

3. The user is initially presented with the level 0 map frame: he can "zoom" to level 1 and/or to more detailed maps, by positioning a cursor; or return to a lower level. He can "pan" across the map, horizontally, vertically or diagonally, causing the system to display the appropriate adjacent frame; or jump to another position by entering the National Grid reference or other identification.

4. The parts of the overlay data which are displayed may vary with zoom level.

The database for a given area falls into two parts: the map information (on videodisc), and the overlay and indexing information (stored on a magnetic disc).

The map frame storage for the scales indicated comprises (assuming a ⅔ overlap at levels 1 and 3, for enhanced "panning" facility):

| level | no. of frames | nominal area covered by frame |
| --- | --- | --- |
| 0 | 1 | 10 km × 20 km |
| 1 | 200 | 3 km × 3 km |
| 2 | 200 | 1 km × 1 km |
| 3 | 20,000 | 300 m × 300 m |
| 4 | 20,000 | 100 m × 100 m |

The videodisc can be generated by photographing sections of maps of appropriate scale and then transferring them to disc; although an expensive process, the cost of producing further discs once a master has been produced is relatively low. If maps for the desired area are available in digital form, direct conversion to microfilm for transfer to videodisc is possible: the resulting system still benefits by not having to hold and transmit the vector coded maps.

The use of a videodisc does suffer from the disadvantages that (at present) it is a read only device. Once having cut a master disc of the map background, it is not possible to modify the maps without producing a new disc. Where map changes are infrequent, this does not present a problem but in applications where up-to-date maps are an essential requirement, the difficulty can be overcome by vector digitising of the map changes (which can then be displayed by the overlay system) accompanied by a 'white out' of the affected map area from the videodisc frame. When sufficient changes to the map have taken place, a new disc can be produced at relatively low cost. For some purposes, it may be preferred to use aerial photographs rather than maps.

For practical purposes (to allow for alignment errors, monitor edge masking and the like) the area covered by a given frame will be slightly larger than the nominal size given above. The accuracy of the photographic and disc production processes is also significant in terms of the measures which need to be taken to ensure adequate alignment between map background and overlay information, as will be seen below.

The following data (referred to as indexing data) needs, in general, to be associated with each map frame.
   (a) Frame number—identifying the location of the map on the disc.
   (b) Identification—defining which area of the map is displayed e.g. the National Grid Reference of the bottom left-hand corner of the nominal map frame area.
   (c) Size—defining the size of the area displayed, this could be either the scale, or the National Grid Reference of another fixed point—e.g. the top right.
   (d) Alignment data—defining the position and size of the map frame in relation to the raster-scan video output produced from the videodisc, e.g., pixel x-y coordinates of two grid-square corners.
   (e) Adjacent frame—viz. frame numbers of the eight number adjacent frames on the same scale; frame number of the more detailed map covering the centre region of the current frame; frame number of the larger map covering the current frame.

It does not follow that all of this information has to be stored individually for each frame in every system; for example:

Identification and size data may not have to be stored if the frames are ordered in a fixed format on the videodisc in such a way that a fixed relationship exists between such data and the frame number. This, however, would place restrictions on the shape of area that could be covered by a single videodisc, and for many applications the loss of flexibility in this respect would be undesirable.

The adjacent frame numbers could, with a fixed format system, be calculated rather than stored. Also, adjacent frames could in principle be identified by searching the indexing data on the basis of Identification and Size; in general this would be too slow.

Alignment data, with ideally accurate photography, and disc production, might be rendered unnecessary, or might be held constant for all maps of a given scale; however this would substantially increase the cost of producing the disc.

Assuming that alignment is maintained for all maps of a given scale, then the "commissioning" of a new disc would require the user to call up one frame for each scale. In each case be would position, using a joystick or graphics tablet, a movable screen cursor to line up with two predetermined reference points on the map; ie. those points (b, c above) whose Grid references are recorded in the indexing data. The system would then record the cursor position as the alignment data.

In the system as shown in FIG. 1, the "panning" operation consists of display of the adjacent frame on the same scale: this can be simply achieved by retrieval of the appropriate adjacent frame number from the indexing data and calling up that frame from the videodisc player. A more sophisticated system might use a frame store into which parts of adjacent frames read from videodisc could, after conversion to digital form employing a suitable video digitiser, be entered, thereby effecting a more gradual panning action. In this situation the frame store forming part of the graphics generator might be employed (thus making the vision mixer unnecessary).

It is assumed here that the indexing data is stored in digital form such as on magnetic disc; although in principle it could be stored on the videodisc in suitably encoded form, e.g. during the field blanking interval. Obviously this does not apply to the alignment data which is not known until after the disc has been made. The alignment data could be generated by a 'once only' digitisation of the map to identify reference points within the frame, or by manually positioning a cursor on the displayed image. In a typical, relatively simple data structure, the overlay data is formatted as a number of variable-length blocks each defining a part of the overlay. Each block comprises:
1. block length
2. graphics type
   line or lines (L)
   filled area (F)
   text (T)
   symbol (S)
3. attributes
   colour
   style (continuous or dotted line, etc.)
4. identity—for systems displaying overlays from more than one source—e.g. to identify Water Board installations or Telephone equipment.
5. number of points
6. list of—National grid coordinates of points
OR N.G. reference followed by text codes
OR N.G. reference followed by symbol code.
For example $$8:L:RD:W:4:0, \frac{2\sqrt{3}}{3}:1, -\frac{\sqrt{3}}{3}:-1, -\frac{\sqrt{3}}{3}:0, \frac{2\sqrt{3}}{3}$$

would define a red dotted line equilateral triangle, side length 2, centred on grid reference 0,0.

In the system as described, the order in which the blocks of overlay data are stored is of no significance. Also it will be noted that the data are referenced to National Grid coordinates and take no account of the manner in which the maps are stored on the videodisc.

For the purposes of the present description, it will be assumed that the computer has the indexing and overlay data available in its memory. In practice, the volume of data will be such that not all of it will be in memory at any given time and thus callup of data from magnetic disc wil be necessary from time to time. The delays caused by this can be minimised by suitable organisation and/or formatting the data in such a way as to minimise the overlay data such that the parts of the magnetic disc in which it resides are related to the geographical position of the features which it represents. Much has been written on virtual memory and paging systems, and the subject will not, therefore, be discussed further here.

In operation, the computer will receive instructions from the user to display desired areas of maps, with or without overlay data, at desired scales. Whether this is achieved by typing instructions or a keyboard, or moving a joystick, position or cursor, or entry on a graphics tablet is not material; fundamentally the input will amount to specifying a given frame either (a) absolutely by its National Grid coordinates and scale, or (b) relatively, with respect to the current frame.

The computer's response, programmed in software, will be firstly (if necessary) to transmit to the graphics generator, (or vision mixer) an instruction to cease displaying any overlay information, then
  (a) search the indexing information to identify the frame number of the map area of the specified scale and grid reference. OR
  (b) locate the indexing information for the current page and read the appropriate adjacent page number according to the horizontal/vertical/diagonal pan or zoom-in/zoom out information specified.
    if the operation is a zoom-in to an area offset from the centre, the "adjacent page" number will be that of the frame corresponding to the centre. The indexing information for that page is therefore read to obtain the frame number of the offset page.
  transmit the frame number to the videodisc player.

By transferring the maps to the disc in a known sequence, it is possible to derive the next frame number to enable a move in any direction by direct calculation from any starting position. Likewise, by holding smaller scale maps at a known position on the disc relative to the larger scale maps, it is possible to derive the next frame number to enable a zoom in or out by direct calculation from any starting position.

Having derived the required frame number, it now becomes necessary to calculate the world coordinates of the map view in order that vector information from the graphics database can be overlayed precisely on the map background. Graphics information is held in National Grid coordinates and map frames have been placed on the disc with a known National Grid reference point (datum) at the bottom left and top right corners.

The coordinates of these reference points can be derived by calculation from the frame number and scale. If it could be guaranteed that these reference points were in precisely the same place on the disc frame, there would be no problem in matching the data to the map. However, in practice, this is not the case since small variations do occur during the disc mastering process.

For each frame, therefore, the frame display software must look up the deviation of the reference points from a known point and apply this correction before true overlaying of the data can occur.

Thus, assuming the simple data structure described above, the following sequence is then entered:
1. Read from the indexing data the Grid reference and scale of the (now) current frame and establish the nominal grid reference limits of the frame.
2. From the nominal limits and the alignment data, compute the conversion data, viz the G.R coordinates of pixels 0,0 and 767, 511 and scaling factors representing G.R. increment per pixel in x and y directions.
3. Examine the first block in the overlay data and ascertain whether any part of the feature (line, block, text, symbol etc.) represented lies within the grid reference limits of the current frame. If not, examine the next and subsequent blocks until one is found which does lie within those limits.
4. Translate the grid reference(s) of the point(s) defining that feature or part of a feature into pixel x-y coordinates by
   (a) computing the G.R. offset of each such point relative to the datum of that frame (b) multiplying the G.R. offsets by the scaling factors to give the pixel x-y coordinates relative to the datum.
5. Transmit the pixel x-y coordinates to the graphics generator, accompanied by the remaining overlay data from that block—viz. colour, attributes, text, symbol codes etc.
6. Repeat steps 3 to 5 until all blocks have been examined.

A computer program, in BASIC, for carrying out this procedure, suitable for a small system in which all the data can be handled as program variables is given below.

It is assumed that the horizontal and vertical grid references of these reference points at the bottom left and top right of frame N are entered as variables GR1H(N),GR1V(N) and GR2H(N),GR2V(N); and pixel coordinates (alignment data) of these points being A1X(N),A1Y(N), and A2X(N),A2Y(N). Upon entry, N is set to the current frame number. The overlay data blocks are assumed to be entered into array elements DB(M,P). M is the block number (varying from 0 to N BLOCK), P is the element of the block, elements 1 to 5 representing the block length, type, attributes, identity and number of points—as described above—and pairs DB(M,6), DB(M,7) etc are the grid references of the points. DISPLAY Is a subroutine which passes DB(M,1) to DB(M,5) and pixel coordinates PX(.) to the graphics generator.

```
10   REM CALCULATE SCALE FACTORS
20   LET KH = ( A2X(N) - A1X(N) ) / ( GR2H(N) - GR1H(N) )
30   LET KV = ( A2Y(N) - A1Y(N) ) / ( GR2V(N) - GR1V(N) )
40   REM CALCULATE FRAME LIMITS
50   LET GROH = GR1H - KH*A1X(N)
60   LET GROV = GR1V - KV*A1Y(N)
70   LET GR3H = GROH + KH*768
80   LET GR3V = GROV + KH*512
90   REM Deal with each block in turn
100  FOR I = 0 TO NBLOCK
110  REM Check whether any part of graphics represented by
the block falls within frame
120  LET FLAG = 0
130  FOR J = 0 TO 2*( DB(I,5) - 1 ) STEP 2
140  IF DB(I,J+6) >= GROH and DB(I,J+6) <= GR3H AND
DB(I,J+7) <= GROV AND DB(I,J+7) = GR3V THEN LET FLAG = 1
150  NEXT J
160  REM Skip if it doesnt
170  IF FLAG = 1 THEN GOTO 250
180  REM Convert to pixel coordinates
190  FOR J = 0 TO 2*(DB(I,5) - 1) STEP 2
200  LET PX(J) = ( DB(I,J+6) - GROH ) / KH
210  LET PX(J+1) = ( DB(I,J+7) - GROV ) / KV
220  NEXT J 230  REM ...and display the block
240  GOSUB DISPLAY

250  NEXT I

260  END
```

In practice, it may be found that this procedure is relatively slow, and economies of processing speed may be made by selecting a data structure in which the location of the data blocks is related to the geographical position of the feature which the data represents.

The graphics database software can be similar to many interactive, graphical editors and provide facilities for the insertion of areas, vectors, text, symbols and circles. Parameters, (colour, line width, level, etc.) can be associated with each data item. Data so entered can have their parameters changed and be moved, copied or deleted. Full advantage can be taken of the graphics processors' ability to selectively erase vector data for move and delete operations and the usual facilities provide to save, restore and clean up the graphics database.

The advantages of this system compared with a fully digital system are that the computer is relieved of the task of storing the map data, sifting through the map data to find the relevant sections relating to the required display area, and sending the map data over a serial link. This means that for a great many applications, the power of a large mainframe computer is no longer necessary, and a self-contained workstation incorporating a microcomputer will be adequate.

We claim:

1. An information display apparatus comprising:
    video reproduction means, adapted for connection to a storage medium having data recorded thereon representing a plurality of map frames of different scales, for producing first video signals representing a selected one of said plurality of map frames;
    graphic generator means for generating, from pre-stored overlay information in digital form, second video signals representing an overlay image;
    means connected to said video reproduction means and said graphic generator means for combining said first and second video signals; and
    control means connected to said graphic generator means and including means for storing information representing said overlay image, said control means for selecting, in response to information indicative of the geographical area covered by, and the relative scale of, (a) said selected map frame, overlay image information stored by the overlay information storage means corresponding to said geographical area and for controlling the graphic generator means to display the overlay information at the same scale as the map frame.

2. Apparatus according to claim 1 in which the video reproduction means is a videodisc player.

3. Apparatus according to claim 1 or 2 including further control means connected to said video reproduction means and said overlay control means manually operable for controlling the video reproduction means to produce video signals representing a map frame geographically adjacent to the map frame previously displayed, the overlay control means being responsive thereto to select the corresponding overlay information.

4. Apparatus according to claim 3, further including a frame store, and store control means, connected to said frame store and to said video reproduction means, for forming in the store a frame for display, said frame comprising parts of two or more map frames stored on the storage medium.

5. Apparatus according to claim 1 further including means, connected to said graphic generator means and adapted for operative connection to said storage medium, for storing alignment information indicating in respect of each, or each group of, frames recorded on the storage medium any offset between the recorded frames and a coordinate system to which the digital overlay information is referenced, the graphic generator means being responsive to said alignment information whereby the overlay information is aligned with the displayed map information.

6. A geographical image display apparatus comprising:
    video reproducing means, adapted for connection to a source of video signals representing plural predetermined map images depicting a geographical area at different, fixed levels of resolution, said video reproducing means for: (a) selecting one of said levels of resolution, and (b) selecting and outputting the video signals corresponding to said selected level of resolution;
    graphics generator means, electrically connected to said video reproducing means and to said digital signal storing means, for (1) determining a scale factor of the image represented by said selected video signals, (2) producing digital signals representing a predetermined overlay image corresponding to said geographical area, said overlay image including plural features corresponding to geographical locations within said area, (3) processing said digital signals in accordance with said determined scale factor, and (4) generating and outputting video signals representing said overlay image scaled to match the determined scale factor; and
    video mixing means, connected to receive the video signals outputted by the video reproducing means and the graphics generating means, for mixing said video signals to generate video signals representing a composite video image depicting said geographical area at said selected resolution overlayed by said overlay image, the features of said overlay image corresponding to locations within said geographical area being superimposed, in said composite image, in registry with portions of said map image depicting said locations.

7. A method of displaying geographical images comprising the steps of:
    (1) selecting, from video signals representing plural predetermined map images depicting a geographical area at different, fixed levels of resolution, video signals representing an image at one of said levels of resolution;
    (2) producing digital signals representing a predetermined overlay image corresponding to said geographical area, said overlay image including plural features corresponding to geographical locations within said area;
    (3) determining a scale factor of the image represented by said selected video signals:
    (4) processing said digital signals produced by said producing step (2) in accordance with said determined scale factor;
    (5) generating, from said processed digital signals, video signals representing said overlay image scaled to match the determined scale factor; and
    (6) mixing said video signals selected by said selecting step (1) with said video signals generated by said generating step (5) to generate video signals representing a composite video image depicting said geographical area at said selected resolution overlayed by said overlay image, the features of said overlay image corresponding to locations within said geographical area being superimposed, in said composite image, in registry with portions of said map image depicting said locations.

8. A geographic image display apparatus comprising:

video reproduction means, adapted for connection to a storage medium storing video information representing plural predetermined map video images depicting corresponding discrete geographical areas, said predetermined map images having different, fixed scale factors, said video reproduction means for: (a) selecting one of said plural map images, (b) retrieving, from the storage medium, the image data corresponding to said selected image, and (c) producing first video signals representing said selected map image;

graphics generator means electrically connected to said video reproduction means for generating second video signals representing an overlay image corresponding to said selected map image, for determining the scale factor of said selected map image, and for varying the scale of said overlay image to match the determined scale factor; and video mixing means, connected to receive the first and second video signals, for mixing said first and second video signals to generate output video signals representing a composite video image of said map image overlayed by said overlay image.

9. An apparatus as in claim 8 wherein said graphics generator means includes:

overlay data storing means for storing data representing overlay images associated with said geographical areas; and processing means connected to said overlay data storing means and preprogrammed to perform the following functions:
(a) retrieve the stored data representing an overlay image associated with the geographical area depicted by the selected map image,
(b) compute a variable scaling factor for said retrieved overlay image data in response to the scale factor of said selected map image so as to match the scale factor of the overlay image with the scale factor of the selected map image,
(c) process said overlay image data in response to said computed variable scale factor, and
(d) convert the processed overlay image data to said second video signals.

10. An apparatus as in claim 8 wherein said graphic generator means includes:

overlay data storing means for storing data representing overlay images associated with said geographical areas; and processing means connected to said overlay data storing means and preprogrammed to perform the following functions:
(a) retrieve the stored data representing an overlay image associated with the geographical area depicted by the selected map image,
(b) process said retrieved overlay image data in response to the scale factor of said selected map image so as to match the scale factor of the overlay image with the scale factor of the selected map image,
(c) further process said retrieved overlay image data so as to superimpose features of said overlay image indicative of geographical locations in registry with points of said selected map image corresponding to those geographical locations, and
(d) convert the further processed overlay image data to said second video signals.

11. An information display apparatus comprising:

information storing means for storing: (a) signals representing plural discrete map images depicting corresponding discrete geographical areas, (b) data associated with each image identifying the geographical location of the geographical area said image depicts, and (c) data associated with each image specifying the relative scale factor of said image;

video reproduction means operatively connected to said storing means for selecting any one of said map images, for retrieving, from said information storing means, the map image signals, location data and scale factor data associated with said selected image, and for converting said retrieved image signals to video signals;

graphic generator means connected to receive said retrieved location data and scale factor data for generating video signals representing an overlay image having a scale factor corresponding to said selected map image and depicting features indicative of the geographical location of said selected map image; and video mixing means, connected to receive the video signals generated by said video reproduction means and said graphic generator means, for mixing said video signals to generate video signals representing a composite map and overlay video image.

12. An information display apparatus as in claim 11 wherein:

the location data stored by said information storing means specifies a geographical grid reference corresponding to the geographical location of the area depicted by the map image associated therewith; and said graphic generator means includes:
overlay storing means for storing (1) data representing plural predetermined overlay images associated with and corresponding to said plural map images, said overlay images being scaled to match the scaling of said map images corresponding thereto and depicting geographical features indicative of the geographical areas depicted by said map images corresponding thereto, and (2) indexing data associated with said overlay image data specifying geographical grid references corresponding thereto; and
means operatively connected to said overlay storing means and to said video reproduction means for selecting stored overlay image data having indexing data associated therewith matching the geographical grid reference corresponding to the selected map image.

13. An information display apparatus as in claim 12 wherein:

said apparatus further includes input means, operatively connected to said video reproduction means, for specifying a geographical grid reference;

said video reproduction means selects one of said images in response to a geographical grid reference specified by said input means; and said stored overlay data selecting means selects stored overlay data in response to said geographical grid reference specified by said input means.

14. An information display apparatus as in claim 11 wherein:

said graphic generator means generates an overlay image depicting geographical and/or cartographical features corresponding to the geographical area depicted by said selected map image; and said video mixing means includes aligning means for superimposing said features of said overlay image with corresponding geographical locations represented by said map image.

* * * * *

UNITED STATES PATENT AND TRADEMARK OFFICE
CERTIFICATE OF CORRECTION

PATENT NO. : 4,661,811

DATED : April 28, 1987

INVENTOR(S) : Michael J. Gray and Ian Langdon

It is certified that error appears in the above-identified patent and that said Letters Patent is hereby corrected as shown below:

Delete (a) from claim 1 at col. 9, line 44.

Signed and Sealed this

Sixth Day of October, 1987

Attest:

DONALD J. QUIGG

Attesting Officer

Commissioner of Patents and Trademarks